Figures 1, 2:
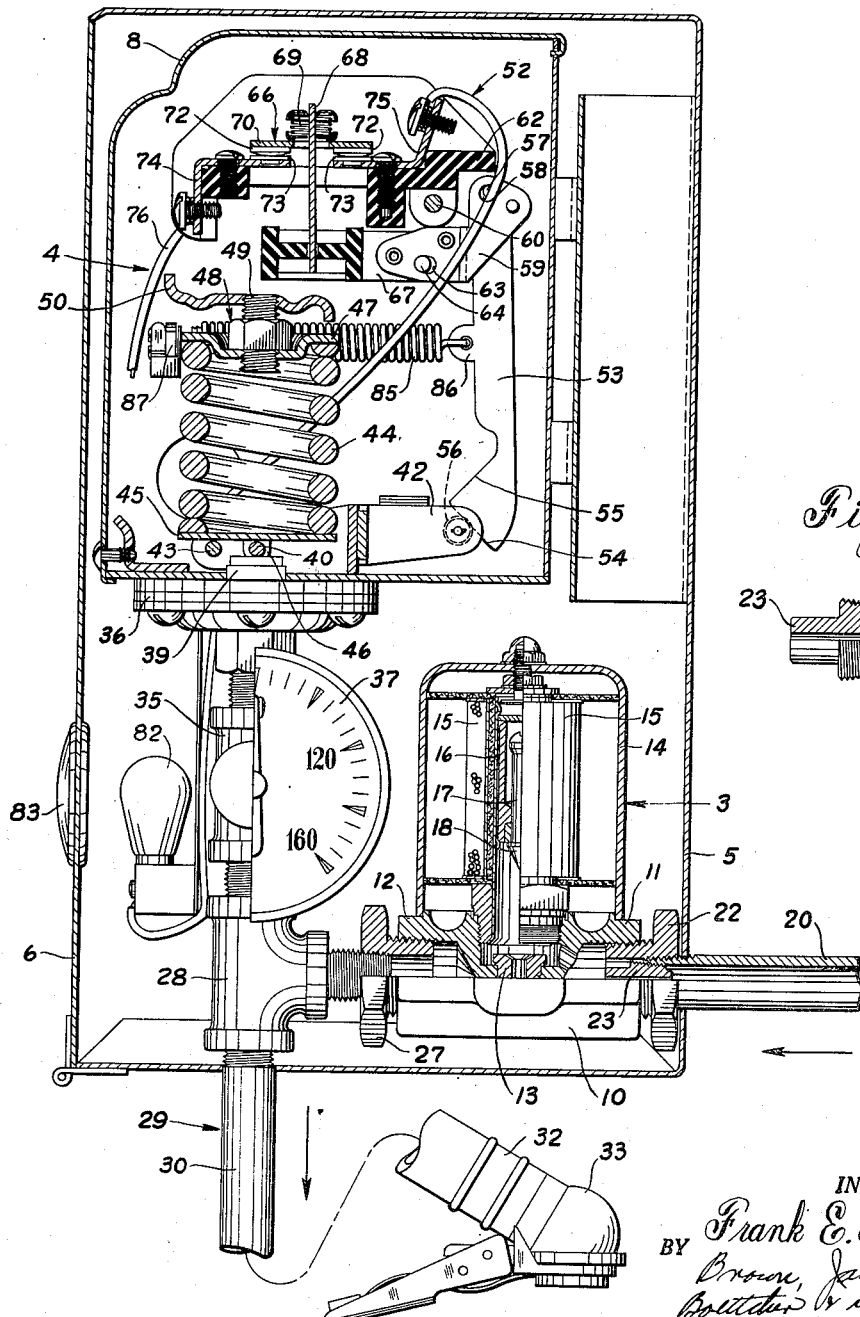

July 27, 1954   F. E. LEARMAN   2,684,685
AUTOMATIC CUTOFF AIR INFLATING DEVICE
Filed Aug. 20, 1949

INVENTOR.
BY Frank E. Learman
ATTORNEYS.

UNITED STATES PATENT OFFICE 2,684,685

AUTOMATIC CUTOFF AIR INFLATING DEVICE

Frank E. Learman, Mishawaka, Ind.

Application August 20, 1949, Serial No. 111,523

1 Claim. (Cl. 137—225)

My present invention relates to a control for fluid dispensing apparatus having utility, for example, for inflating vehicle tires.

It is an object of my invention to provide a control for fluid dispensing device for charging any desired fluid container with fluid at a predetermined pressure.

The apparatus of my invention is adapted to be connected to any suitable supply source of fluid under pressure and includes shut-off valve means operable for closing the connection between the supply source of fluid under pressure and the container being charged when the fluid in the container is at the desired predetermined pressure. In the preferred form of my invention herein disclosed the apparatus is of a character for inflating vehicle tires, and controls the delivery of air from any suitable source of air under pressure, such as the air pressure tank of a compressor, to the tire so that when the air in the tire is at the desired predetermined pressure the apparatus is automatically actuated to closed position.

The apparatus herein disclosed is of utility, for example, in the inflating of tires after they have been mounted on wheels prior to delivery of the wheels to an assembly line for assembling on a vehicle. In assembly line operation it is of course desirable to provide for the rapid inflation of tires after they have been assembled on the wheels for the delivery of the wheel with the inflated tires to the assembly line, and it is an object of my invention to provide an apparatus for charging the tires with air in a minimum amount of time.

In the sub-assembly operation of mounting of the tires on the wheels they are carried along a continuously moving conveyor for delivery to the main assembly line. In attaching the hose to the tire valve and with the assembled wheel and the tire moving on the conveyor it is desirable to provide for the rapid inflation of the tire to enable the worker to attach and detach the air hose in a short distance of movement of the conveyor so that the tire may be inflated without the worker moving any great distance from his work station.

In order to achieve the aforesaid object, I propose to provide an apparatus embodying a suitable known shut-off valve such as a solenoid valve, the inlet of which is adapted to have connection by means of a suitable metering tube with a source of fluid under pressure, such as an air storage tank, and in which the fluid under pressure is necessarily in excess of that to be delivered to the container to be charged. Suitable discharge conduit means is provided for connecting the outlet of the shut-off valve to the container to be charged and such means preferably comprises a branch connector, such as a T fitting. A hose extends from one branch of the T fitting and includes a discharge valve for controlling the flow of fluid therethrough to the container to be charged. The other branch of the T fitting has connection with a suitable known pressure responsive means which is associated with the shut-off valve to effect closing of the latter when the fluid pressure in the container being charged is at the desired predetermined pressure.

An important feature of my invention resides in the provision of metering tube means providing for reduction of the pressure of the fluid flowing through the shut-off valve below that of the pressure of the source of fluid under pressure so that the pressure responsive means is responsive to the pressure of the fluid with which the container is being charged, and not that of the pressure of the source of fluid under pressure.

A further preferred feature resides in the provision of a pressure responsive means which includes means whereby the predetermined pressure to which the container is to be charged may be varied.

A further preferred feature resides in the provision of an apparatus of the character indicated including an electrically operable shut-off valve, such as a solenoid valve, and pressure responsive means having switch means for controlling energization and de-energization of the shut-off valve to effect the opening and closing of the latter.

A further preferred feature resides in providing signal means preferably in the form of a lamp which is caused to be energized when the shut-off valve means is open.

A still further preferred feature resides in providing a pressure gauge means for indicating the fluid pressure in the discharge conduit means.

The above and other objects, features and advantages of my invention will appear from the detailed description.

Now in order to acquaint those skilled in the art with the manner of constructing and utilizing an apparatus in accordance with my present invention, I shall describe in connection with the accompanying drawing a preferred embodiment of my invention.

In the drawing:

Figure 1 is a side view of an apparatus constructed in accordance with my invention in which the casing for the apparatus is shown in section, and in which certain of the parts of the apparatus are broken away and shown in section; and Figure 2 is a view, partly in section and partly in elevation, of the metering tube means embodied in the apparatus of Figure 1.

For purposes of disclosing my invention I have chosen to show it embodied in an apparatus for inflating automobile tires with air at a predetermined pressure. Upon reference to the drawing, it will be seen that the apparatus comprises solenoid shut-off valve means 3 and a pressure responsive means 4 providing for opening and closing of the shut-off valve 3. The shut-off valve means 3 as shown is enclosed within a sheet metal casing 5 having a hinged cover 6 which provides access to the interior of the casing. A sheet metal housing 8 for enclosing the pressure responsive means 4 is also contained within the casing 5, and is disposed adjacent the upper end of the latter.

In the apparatus shown in the drawing, the shut-off valve 3 is of known construction. Essentially the shut-off valve 3 comprises a valve body 10 having an inlet 11 and an outlet 12, and is provided with a removable valve seat member 13 between the inlet and outlet. A solenoid housing 14 is supported on the valve body 10 and encloses a hollow tubular coil 15 which surrounds a plunger tube member 16. A plunger 17 of magnetic metal is disposed within tube member 16 and at its lower end carries a conical valve member 18 which is adapted to engage with seat 13 to close the valve. The valve 3 is shown in the drawing with the plunger 17 disposed at the upper end of the tube member 16, as when the coil 15 is energized for permitting the flow of fluid under pressure from the inlet 11 through valve seat 13 to the outlet 12 of the valve. The inlet 11 of the valve 3 is connected with a suitable source of fluid under pressure by a pipe 20 which has threaded engagement in a suitable union 22 threaded in the inlet of the valve. A metering tube member 23, shown in detail in Figure 2, is formed with a threaded tapered portion 24 which has threaded engagement in the outer end of the pipe 20, and has a bore 25 of considerably less diameter than the diameter of pipe 20 to provide for metering of the flow of fluid under pressure from the supply source, such as a compressor tank to the inlet 11 of the valve. In an apparatus constructed as shown in the drawing for use with a supply source of fluid under pressure of the order of 100 pounds per square inch, it was found that the metering tube member 23 formed with a bore 25 of a diameter of .063–.065 inch and a length of .675 inch effected suitable reduction in the pressure of the air following through the valve 3 for satisfactory operation of the apparatus.

The outlet 12 of the shut-off valve 3 is connected by means of a suitable union 27 to a T fitting 28 forming part of a discharge conduit means, indicated generally at 29, through which the fluid under pressure is conducted to a container to be charged. The discharge conduit means 29 includes a pipe 30 threaded to one branch of the T fitting 28 and a flexible hose 32 has suitable connection with the discharge pipe 30 with the outer end of the hose 32 having a conventional form of tire or Carter valve secured thereto. The discharge orifice of the tire valve 33 is of smaller cross-sectional area that that of bore 25 of the metering tube member 23 to provide for building up of back pressure in the discharge conduit means 29 when fluid is flowing through the valve 3, and which back pressure as will presently appear provides for controlling operation of the apparatus to effect closing of the shut-off valve means 3 when the fluid in the container to which the tire valve 33 is connected is at the desired predetermined pressure.

The T fitting 28 of the discharge conduit means 29 also has connection by means of a second T fitting 35 with a diaphragm valve 36 of the pressure responsive means 4. A known conventional pressure gauge 37 is also connected to the T fitting 35 for indicating the pressure of the fluid in the discharge conduit means 29. The pressure responsive means 4 shown in the drawing is also of known construction. The previously mentioned apparatus constructed in accordance with my invention and as shown in the drawing embodied this specific form of switch. The diaphragm valve 36 of the pressure responsive means 4 is of conventional construction, and comprises a stem member 39 connected centrally of the diaphragm of the valve 36 for movement with the diaphragm. The stem member at its outer end has engagement with a pin 40 carried by a lever 42 pivotally mounted at one end about a fixed pivot pin 43. A coil spring 44 is provided for normally biasing the lever 42 in a clockwise direction about pivot pin 43 in opposition to movement of the stem 39 fixed to the diaphragm of the diaphragm valve 36 against the pressure of the fluid in the discharge conduit means 29. The coil spring 44 at its lower end seats on an end plate member 45 which has an integral ear 46 disposed about the pin 40. The coil spring 44 at its upper end bears against an adjusting plate member 47. The plate member 47 is adjustable to vary the tension of coil spring 44 by means of the nut and bolt means indicated generally at 48, of which the bolt 49 has threaded engagement in a suitable supporting frame member 50, which is rigidly fixed in the housing 8. By adjustment of the nut and bolt means 48 the force of the coil spring 44 may be varied to vary the pressure required in the discharge conduit means 29 for effecting movement of the diaphragm stem 39 to a position to cause movement of the lever 42 to a position for effecting actuation of the pressure responsive means in a manner to be described.

The pressure responsive means 4 further comprises switch means indicated generally at 52 and which comprises an actuating lever 53 which at one end is formed with inclined edges 54 and 55 adapted to be engaged by a roller 56 carried at the end of the lever 42 opposite the end pivotally mounted on the pivot pin 43. The inclined edges 54 and 55 of the switch actuator member 53, together with the roller 56 of the lever 42, form a snap action switch mechanism operable in a manner similar to that of the construction shown in Reissue Patent No. 17,304, dated May 28, 1929, to G. A. Knaak. The switch actuator member 53 at the end thereof opposite the inclined edges 54 and 55 carries a pin 57 which projects into an opening 58 formed in one arm of a bell crank lever 59 pivoted as at 60 about a pivot pin carried in the insulating terminal block 62 of the switch means 52. The other arm 67 of the bell crank 59 is formed with an opening 63 into which a fixed pin 64 projects. The openings 58 and 63 are slightly larger than the diameter of the pins 57 and 64 and provide for movement of the bell crank 59 about pivot 60 upon movement of the lever 42 with respect of the inclined edges 54 and 55 of the switch actuator 53 to effect opening and closing of the switch contacts indicated generally at 66. As shown, the arm 67 of the bell crank lever 59 carries a stem 68 resiliently mounted as at 69 to a bridge member 70 which carries a pair of movable contacts 72—72 of the switch means 52. The movable contacts 72—72 are adapted to have engagement with fixed contacts 73—73 mounted, respectively, on terminals 74 and 75 supported on the block of insulating material 62. The terminal 74 is adapted to be connected to one of a pair of power lines, and the terminal 75 is connected by suitable lead means to the solenoid valve means 3. The pressure responsive means 4 further comprises a second set of movable and stationary contacts and terminal members (not shown) of the construction described, and to which the other line of the pair of power lines and lead means for the coil 15 of the shut-off valve 3 are connected to provide for connecting the solenoid coil 15 in circuit with a suitable source of electricity when the movable contacts of the switch means 52 are in engagement with the stationary contacts.

In the preferred form of the apparatus of my invention, I propose to provide signal means including a lamp 82 which may be seen through the window 83 in the cover 6, and which signal lamp means is adapted to have the terminals thereof connected to the pair of terminals of the switch means 52 from which the leads extend to the shut-off valve 3, so that when the coil 15 of the shut-off valve 3 is energized the lamp 82 will also be energized to give a visual indication to the operator that the shut-off valve 3 is open and is admitting fluid under pressure through the discharge conduit means 29.

The pressure responsive means 4 as shown comprises a second coil spring 85 which is connected at one end to the ear 86 of the switch actuating arm 53 and at its other end to an adjustable stationary support indicated at 87.

The operation of the apparatus is as follows:

Assuming that it is desired to charge a tire with air at a pressure of fifty-four pounds per square inch, appropriate adjustment of the coil spring 44 is made so that when that desired predetermined pressure exists in the discharge conduit means 29, the diaphragm valve 36 is caused to be actuated to effect movement of lever 42 to open the switch means 52. In the position of the parts of the apparatus as shown in Figure 1, the source of fluid under pressure is connected through the tire valve 33 to the tire being charged with fluid under pressure. When the pressure in the tire and in the discharge conduit means 29 reaches the desired predetermined pressure of fifty-four pounds per square inch, the pressure in the discharge conduit means 29 is effective to urge the diaphragm stem 39 upwardly into engagement with the pin 40 to move the lever 42 in a counter-clockwise direction about its pivot pin 43 against the force of spring 44. In such movement of the lever 42 the roller 56 thereof rides up the inclined edge 54 of the switch actuating member 53, and after the roller passes the corner intersection of the edges 54 and 55 the coil spring 85 is effective for drawing the switch actuating member 53 in a direction to engage the inclined edge 55 thereof with the roller 56. Such movement of the switch actuating member 53, and resultant movement of the bell crank 59 about its pivot 60 effects vertical upward movement of the stem 68 to separate the movable contacts from the stationary contacts of switch means 52 which effects opening of the circuit through the coil 15 permitting the shut-off valve 3 to close. The pressure responsive means 4 is thus effective to cause closing of the shut-off valve 3 when the desired predetermined pressure of fluid in the container being charged is reached.

Upon disengagement of the tire valve 33 from the tire being charged, the pressure in the discharge conduit 29 by escape of air before valve 33 closes will be reduced below that for which the spring 44 is set and the pressure responsive means 4 will effect rapid opening and reclosing of the shut-off valve means 3. In the apparatus constructed as shown in the drawing and embodying the specific aforementioned parts, under the conditions assumed of one hundred pounds per square inch pressure in the supply tank, and with the coil spring 44 being set to effect charging of the tire with air at fifty-four pounds per square inch, the pressure in the discharge conduit means 29 upon detaching of the tire valve 33 from the tire builds up to the order of eighty pounds per square inch. Thus, at the start of the next succeeding cycle of operation of the machine, the pressure in the discharge conduit means 29 of the apparatus of my invention will be at substantially the pressure of eighty pounds per square inch, but this pressure will rapidly drop below the desired pressure of fifty-four pounds to which the tire is to be inflated, and when the pressure of fifty-four pounds per square inch is reached, the pressure responsive means 4 is actuated and effects closing of the shut-off valve 3. So long as the tire valve 33 remains attached to the tire stem, the pressure in the discharge conduit means 29 will be maintained at the aforementioned fifty-four pounds per square inch, but upon removal of the discharge valve 33 from the tire, the escape of fluid under pressure from the discharge conduit means 29 effects the aforementioned rapid opening and reclosing of the shut-off valve 3, so that the discharge conduit means is again charged with fluid at the aforementioned pressure of eighty pounds per square inch.

In the apparatus of my invention it will be observed that the metering tube member 23 provides for reduction of the pressure of the fluid flowing through the shut-off valve 3 and the discharge conduit means 29 substantially below the pressure of the fluid at the supply source of fluid under pressure, so that the pressure responsive means 4 is responsive to the pressure of the fluid in the discharge conduit means 29 and not to the pressure of the source of fluid under pressure.

The pressure gauge 37 as previously noted provides an indicating means by which the operator may observe if the apparatus is functioning properly. Also, as has already been noted the lamp 82 is energized when the shut-off valve 3 is opened, and serves, upon its extinguishment, after the discharge hose has been connected to a tire to indicate that the tire has been charged with air at the desired predetermined pressure so that the operator may remove the discharge hose from the tire.

The specific forms of shut-off valve 3 and pressure responsive means 4 above referred to are typical of known devices which may be embodied in the apparatus of my invention, and since they are well known they have only been described in sufficient detail to understand my present invention, and it will be understood that such parts of the apparatus of my invention may vary widely in construction and form.

While I have shown and described what I consider to be a preferred embodiment of my invention, it will be understood that various modifications and rearrangements may be made therein without departing from the spirit and scope of my invention.

I claim:

An apparatus for charging a container with fluid at a predetermined pressure from a source of fluid under pressure greater than said predetermined pressure comprising, solenoid shut-off valve means having an inlet and an outlet, spring loaded pressure responsive means having single switch means for effecting opening and closing of said solenoid shut-off valve means, means for connecting said pressure responsive means with the outlet of said shut-off valve means, means for said pressure responsive means operable at and above said predetermined fluid pressure at the outlet of said shut-off valve means to effect closing of the switch means of the latter and at fluid pressure below said predetermined pressure to open said switch means of said shut-off valve means, metering tube means having a bore and disposed in said inlet, discharge conduit means having connection to the outlet of said shut-off valve means, and valve means biased toward closed position for said discharge conduit means and having a discharge orifice of smaller cross sectional area than the bore of said metering tube means, said latter valve means being responsive to pressure in said discharge conduit means for closing said conduit, whereby upon momentary opening of said latter valve means at said predetermined pressure at said outlet of said shut-off valve thereby reducing said pressure below said predetermined pressure, said pressure responsive means effects rapid opening and closing of said shut-off valve means to provide fluid under pressure at the outlet of said shut-off valve means in excess of said predetermined fluid pressure so that with said latter valve means in its closed position said pressure responsive means permits said shut-off valve means to close.

References Cited in the file of this patent

UNITED STATES PATENTS

| Number | Name | Date |
|---|---|---|
| Re. 19,148 | Woodford | Apr. 24, 1934 |
| 2,057,889 | Fagan | Oct. 20, 1936 |